United States Patent
Ng et al.

(10) Patent No.: US 10,347,225 B2
(45) Date of Patent: Jul. 9, 2019

(54) SYSTEM AND METHOD A MOBILE CELLO STAND

(71) Applicant: CelloGard LLC, Berkeley, CA (US)

(72) Inventors: Robert Raymond Ng, Berkeley, CA (US); Fredrick Arnold Goodman, Oakland, CA (US)

(73) Assignee: CelloGard LLC, Berkeley, CA (US)

( * ) Notice: Subject to any disclaimer, the term of this patent is extended or adjusted under 35 U.S.C. 154(b) by 0 days.

(21) Appl. No.: 15/824,949

(22) Filed: Nov. 28, 2017

(65) Prior Publication Data

US 2018/0151157 A1    May 31, 2018

Related U.S. Application Data

(60) Provisional application No. 62/427,633, filed on Nov. 29, 2016.

(51) Int. Cl.
| | | |
|---|---|---|
| *G10D 3/00* | (2006.01) | |
| *G10G 5/00* | (2006.01) | |
| *F16M 11/22* | (2006.01) | |
| *G10D 1/02* | (2006.01) | |

(52) U.S. Cl.
CPC ............ *G10D 3/003* (2013.01); *F16M 11/22* (2013.01); *G10G 5/00* (2013.01); *G10D 1/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,774,096 | A * | 8/1930 | Hasterok | G10G 5/00 211/182 |
| 2,058,184 | A * | 10/1936 | Sherrard | G10G 5/00 211/20 |
| 2,455,821 | A * | 12/1948 | Conrad | G10G 5/00 211/85.6 |
| 2,736,225 | A * | 2/1956 | Marcus | G10G 5/00 248/129 |
| 5,986,193 | A * | 11/1999 | Garrison | G10G 5/00 248/598 |
| 6,015,121 | A * | 1/2000 | Reid | A47F 7/00 248/150 |
| 6,326,531 | B1 * | 12/2001 | Bremner | G10G 5/00 84/327 |
| 6,416,029 | B1 * | 7/2002 | Holtermanns | G10D 13/026 248/346.06 |

(Continued)

FOREIGN PATENT DOCUMENTS

| | | | | |
|---|---|---|---|---|
| DE | 807886 | C * | 7/1951 | ............. G10G 5/00 |
| DE | 102015103948 | A1 * | 9/2016 | ............. G10D 3/003 |
| FR | 1040933 | A * | 10/1953 | ............. G10G 5/00 |

*Primary Examiner* — Robert W Horn
(74) *Attorney, Agent, or Firm* — Alpine Patents LLC; Brian Van Osdol

(57) ABSTRACT

A cello stand system for holding a cello that includes a base; a first and second arm, where each arm comprises at least one cello engagement region on an inner-side of the arm; where each arm is attached in an upright orientation along the length of the base; and where the inner-sides of the first and second arms and a top surface of the base define a cello holding cavity. The cello stand system functions to engage with a cello across a rib of the upper or lower bout to hold a cello on its side in a horizontal position.

15 Claims, 16 Drawing Sheets

(56) References Cited

U.S. PATENT DOCUMENTS

| | | | | |
|---|---|---|---|---|
| 6,683,237 B2* | 1/2004 | Christou | ................ | G10G 5/005 |
| | | | | 84/327 |
| 6,696,626 B1* | 2/2004 | Pagenkopf | ............. | G10D 3/003 |
| | | | | 84/280 |
| 8,536,432 B1* | 9/2013 | Herring | ................... | G10G 5/00 |
| | | | | 84/327 |
| 9,214,141 B2* | 12/2015 | McNutt | ................... | G10G 5/00 |
| 9,230,524 B2* | 1/2016 | Cortina | ................... | G10G 5/00 |
| 9,767,776 B2* | 9/2017 | Dingwall | ............. | F16M 11/041 |
| 2018/0151157 A1* | 5/2018 | Ng | ........................... | G10G 5/00 |

* cited by examiner

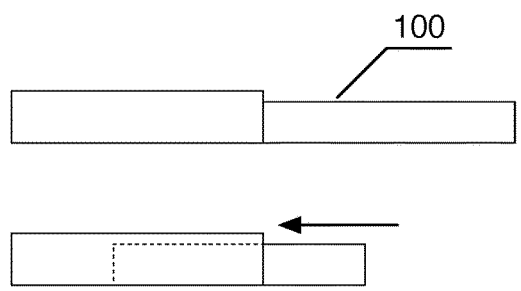
FIGURE 10
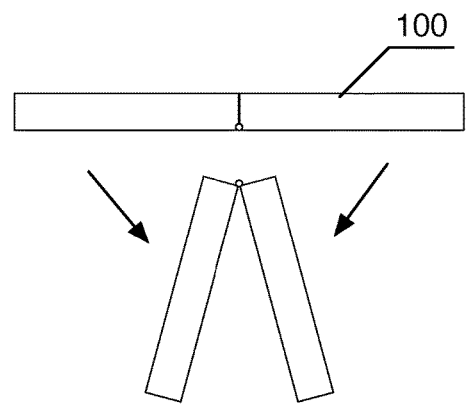
FIGURE 11
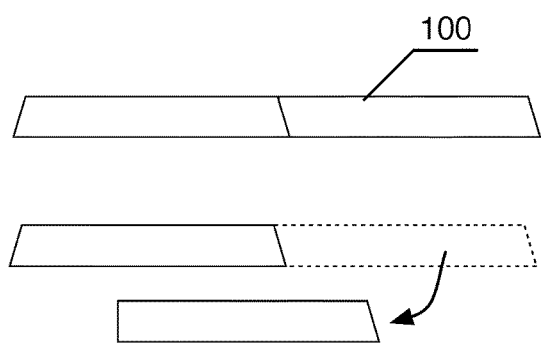
FIGURE 12
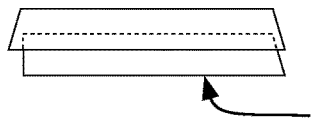

SYSTEM AND METHOD A MOBILE CELLO STAND

CROSS-REFERENCE TO RELATED APPLICATIONS

This Application claims the benefit of U.S. Provisional Application No. 62/427,633, filed on 29 Nov. 2016, which is incorporated in its entirety by this reference

TECHNICAL FIELD

This invention relates generally to the field of cello stands and supports, and more specifically to a new and useful system and method for a compact and mobile cello stand.

BACKGROUND

There are numerous products available in the market for holding instruments when they are not being stored in their cases. However, very few of these products are designed to hold cellos, and the cello stands that are currently sold in the market are primarily designed to hold a cello in an upright position. Furthermore, these products are large and heavy, and even those that can be disassembled into smaller components are unwieldy and awkward to use. Because of these limitations, current cello stands are typically used only for display purposes (e.g. in a music store showroom) or for storage in protected environments (e.g. in a private studio or home). Given their size and inconvenience, current cello stands are rarely used by cellists in more normal situations when they are moving about, or when rehearsing and performing in various, busy, temporary environments with high foot traffic and limited workspace (e.g. stages, rehearsal rooms, recording studios, the orchestra pit, public events, etc.). In these conditions, the typical solution for the cellist is to not use a stand at all. If his or her cello case is not easily accessible (a common occurrence), the cellist will normally place his or her instrument on the floor, resting on its side. In this position, the cello is stable but highly vulnerable, since the slightest bump can topple the cello onto its side or back, causing major damage that can be very expensive to repair. Thus, there is a need in the field of cello stands and supports for a new and useful system for compact and mobile cello stand. This invention provides these dual benefits.

BRIEF DESCRIPTION OF THE FIGURES

FIGS. 10-12 are schematic representations of variations of a collapsing base;

DESCRIPTION OF THE EMBODIMENTS

The following description of the embodiments of the invention is not intended to limit the invention to these embodiments but rather to enable a person skilled in the art to make and use this invention.

Figure 1:
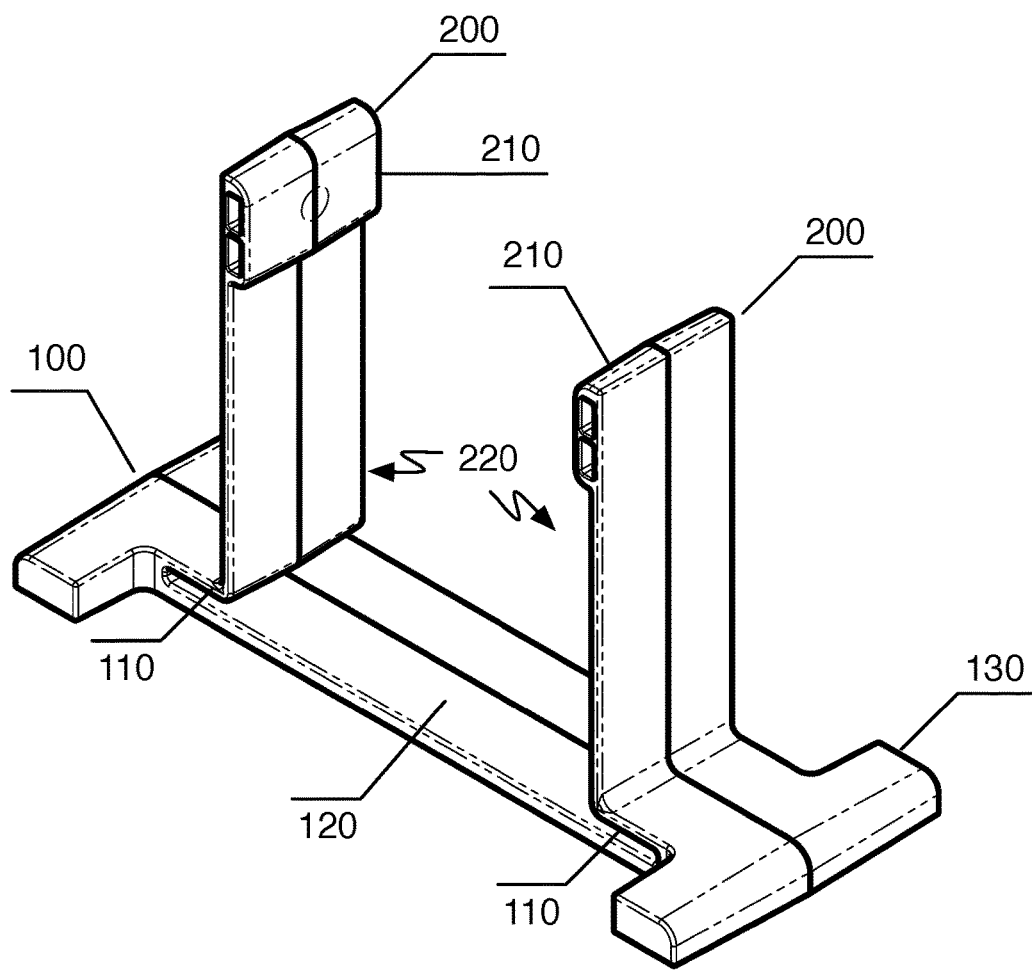
FIG. 1 is a schematic representation of one preferred embodiment of the system.

As shown in FIG. 1 a system for a mobile cello stand of a preferred embodiment can include a base 100 and at least two arms 200 (e.g., a first and second arm); where each arm 200 includes one cello engagement region 210 on an inner-side 220 of the arm; where each arm is attached along the length of the base possibly through a base-arm attachment interface 110; and where the configuration of the cello attachment interfaces is such that the inner-sides of the two arms and a top surface of the base define a cello holding cavity.

The cello holding cavity is preferably a shaped space in which a cello can be inserted. The space is defined by the elements of the system forming essentially three walls—two opposite side surfaces and one bottom surface. The cello holding cavity is preferably defined to allow the instrument to rest so that the front and back sides are partially cradled, with the instrument extending through the cavity from one side to another. The shape of this cello holding cavity or opening may additionally be flexible and/or adjustable such that the defined cello holding cavity can change.

Figure 2:
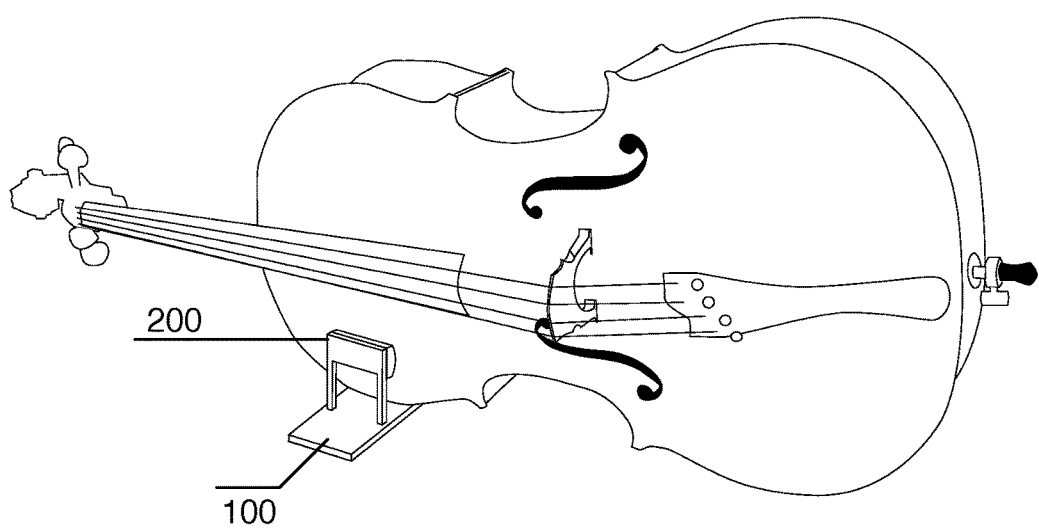
FIG. 2 is a schematic representation of the system used with a cello.
Figure 3:
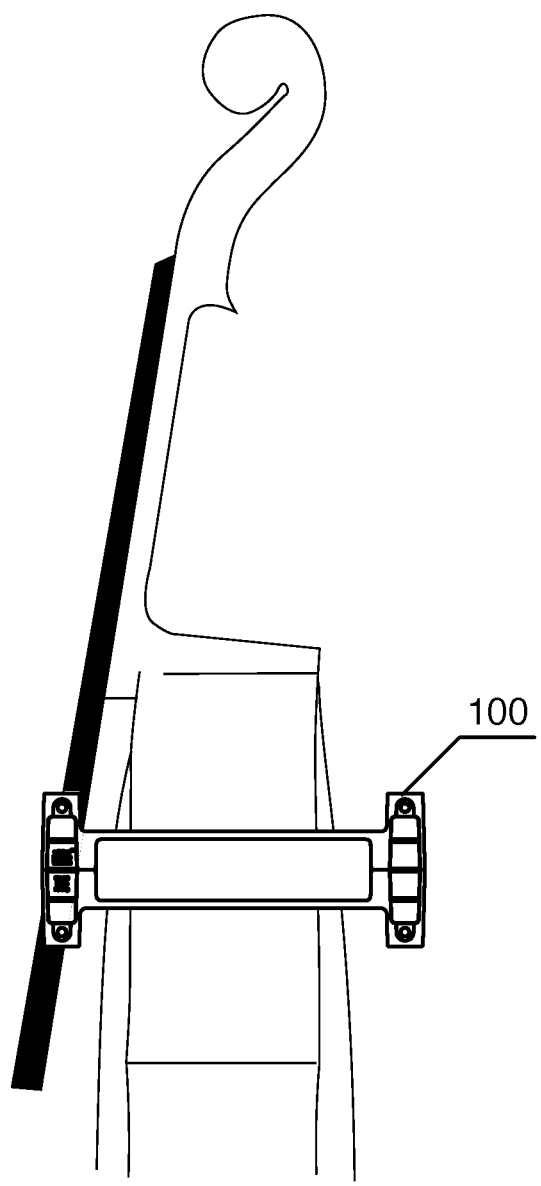
FIG. 3 is a schematic representation of the system used with a cello shown from a bottom view.

The system functions to hold the cello in a horizontal position on its side using a compact, mobile stand as shown in FIG. 2. In particular, the system preferably enables a cello to be held and stabilized by temporarily engaging across the side width (i.e., the cello rib) of the cello at the upper bout (i.e., the top half of the instrument) as shown in the bottom view of FIG. 3. The system may alternatively or additionally be designed to engage across the cello rib of the lower bout or any suitable region. The system preferably enables a user to rest the instrument in this side position when not using the instrument while rendering such a holding position safe through use of the system. When a user wants to use the instrument, the user can lift the cello out of the cello holding cavity.

This system preferably addresses the great need as discovered by the applicant for a device that is designed to securely hold cellos that are resting on their sides (as opposed to the common approach of an upright position), when they are placed on the floor, or any similarly flat surface (e.g. table top, work bench, etc.), and a system that is small and compact to be easily transported and used during real life scenarios. Preferably, the system can be carried along with or even inside a normal cello case, so that the device is convenient to carry and unobtrusive enough that it can even be used in crowded performance venues.

The system preferably prevents or reduces the chances that an instrument will be accidentally toppled over when rested on its side. The system can thus prevent an instrument from tipping over and landing on the back, the fingerboard, or its bridge, causing damage to the instrument. Additionally, the horizontal side resting position is common and familiar to cellists, and allows for convenience when performing or rehearsing.

The system preferably leverages the design of the instrument in creating a substantially stable resting position that is robust against a degree of accidental bumps or collisions. When engaged at the upper bout, the system provides an extended ground contact surface area along an axis perpendicular to the face of the instrument—this can enhance stabilization from falling onto the front or back face of the instrument. In particular, the system provides stabilizing lateral support to prevent the cello from tipping over. Ground contact of the lower bout can work cooperatively with the system to provide other ground contact points and further stabilizing along the opposing axis as shown in FIG. 2. By leveraging portions of the instrument to provide some of the stabilization, the system may be made smaller, which can improve portability.

The system may additionally be reconfigurable wherein the arms and/or the base include at least one adjustable component. The adjustments may function to enhance mobility by making the system at least partially collapsible and/or by enabling adjustment of the arms to accommodate different sized instruments. A collapsible variation includes at least one mechanism to transition the system between an open configuration and a closed configuration. An open configuration is a physical arrangement of the system used when holding an instrument as shown in the exemplary embodiment of FIG. 4. A closed configuration of the system is a physical arrangement of the system that can be used when not holding an instrument as shown in FIG. 5. The closed configuration is preferably used when storing or moving the system and can include collapsed components, components moved into a "closed configuration" position, detached, or augmented in any suitable manner.

The system is preferably used in holding a cello, but alternative embodiments may be used for holding a string bass or other similar instrument. Additionally, the system may be configured to hold a range of instrument variations within one class of instrument to accommodate different designs and sizes (e.g., full size cellos, three-quarter sized cellos, half sized cellos, quarter sized cellos, eighth sized cellos, tenth sized cellos, etc.). Herein, the system will be described as being used for a cello. Additionally, luthiers, instrument repair people, instrument shop operators, and/or other types of users (in addition to or as an alternative to musicians) may benefit from a convenient instrument stand such as the one described herein.

As one potential benefit, the system can provide a convenient stand to hold the cello in a substantially stable position. As described, the held instrument is preferably positioned on the floor or other suitable platform (e.g., a repair table, display platform, storage shelf, etc.) resting horizontally on its side. The top half of the instrument preferably rests on and is held in the stand across its rib while the bottom half rests on the floor. This position is familiar to cellists and can be convenient for easily setting the instrument down and accessing the instrument while a cellist is sitting, resting, or performing.

As another potential benefit, the system can provide a cello stand that could function well in real world scenarios. The system could be used when rehearsing or performing since the stand could prove unobtrusive to the performance environment. The system, being compact, could also be easily moved in and out of position if needed. The stance of the cello when stabilized by the system is also one that would be convenient for a seated player to insert and remove a cello from.

Figure 6A:
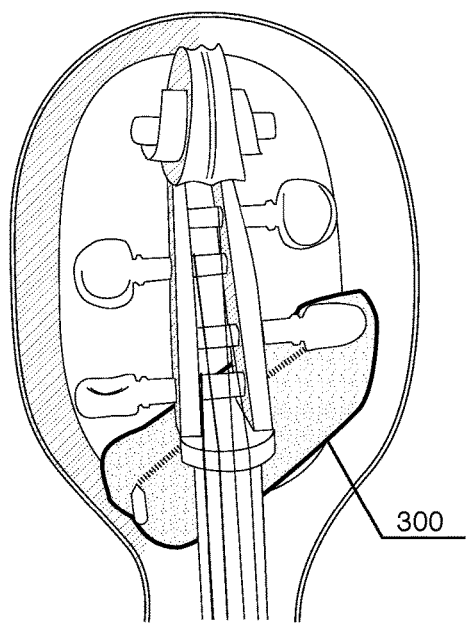
FIGS. 6A and 6B are schematic representations of the system stored within a case and placed for transport with the cello.
Figure 6B:
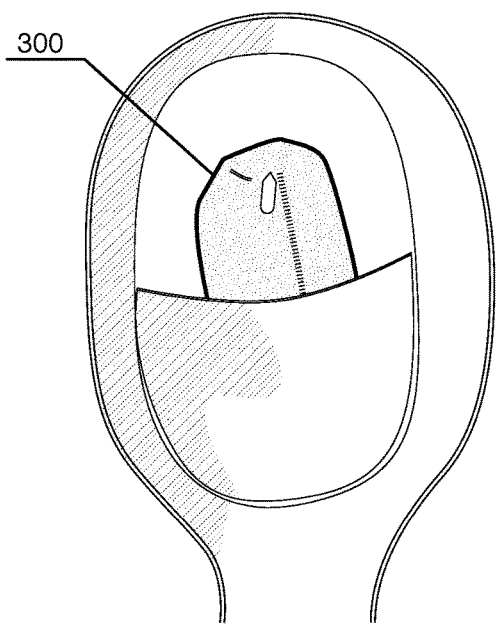

As another potential benefit, the system can provide a high level of mobility. Many preferred embodiments are sufficiently small that they can be conveniently carried with a cello, either within the cello case, attached to the case, or in a small accompanying bag. In some embodiments, the cello stand can fold and/or collapse from an open configuration to a closed configuration. The closed configuration is preferably a very compact form factor. In some variations, the cello stand, when in a closed configuration, fits a volumetric form defined to fit in defined cavities between a cello and a cello case. For example, the cello stand in a closed position could be held in a case 300 and stored in the defined cavity behind the scroll of the cello and the case as shown in FIG. 6A or in the accessory pocket of the case as shown in FIG. 6B.

As another potential benefit, the system can accommodate a wide variety of instrument sizes with little or no adjustment. Cellos can come as full sized, three-fourths sized, half-sized, and the like. Additionally, even a cello of the "same" size category will have varying dimensions and geometric forms depending on the particular instrument and/or instrument maker. The cello stand preferably uses a mechanism to make a flexible cello holding cavity that can preferably be readily used across a wide range of cello sizes. The cello holding cavity defined by the cello stand preferably includes one or more flexible members and/or an adjustable member such that a secure fit can be made to accommodate a range of cello dimensions. Some variations of the cello stand system can include adjustable elements to enhance the fitting of the cello stand and a particular cello.

The component configuration of the cello stand preferably involves the first and second arm 200 fixed to the base 100 creating a space for the cello. As described above, the configuration of the arms 200 with the base 100 (potentially attached through a base-arm attachment interface 110) is such that the inner-sides of the two arms 210 and a top surface of the base 120 define a cello holding cavity. Configuration of the arm attachment positioning can include spacing (e.g., the distance between the two attachment interfaces 110 and as a result the arms 200), positioning, and/or arm angle. The two arms 200 preferably project upward from the base 100. This upward direction may be a perpendicular arrangement but could alternatively be angled so that there is some vertical displacement between the top surface of the base 120 and the contact point of the arms (e.g., the cello engagement region 210). Preferably, a top portion of the arm 200 (i.e., the distal end of the arm) projects inward from the arm's attachment point to the base 100 such that the arm 200 makes contact with the cello only in one region in the upper portion of the arm 100. A first arm 200 is preferably attached to the base 100 in a first half of the base and a second arm 200 is preferably attached to the base 100 in a second half such that the spacing of the arms accommodates the side width range of targeted cello instruments. The two arms 200 are preferably faced in opposing directions such that the inner-side 220 of the first and second arm face each other. The two arms 200 preferably contact the cello on the front and back of the cello when a cello is held by cello stand. In some variations, contact with an arm may not be a requirement. For example, an arm may serve as a safeguard that blocks the cello from tipping over.

As described, the first and second arms 200 preferably extend upwards within the cello holding cavity. The distance between the first and second arms 200 preferably defines the size of the cello holding cavity (i.e., the cello holding cavity length). A portion of the base 100 along its length may additionally extend beyond the attachment point of arms. In other words, the length of the base is preferably longer than the size of the cello holding cavity. In one variation shown in FIG. 7, the first arm 200 attaches to the base 100 at least two inches from a first end of the base, and the second arm 200 attaches to the base 100 at a position that is also two inches from the second end of the base 100 along the length of the base (i.e., the end opposite the first end). The first and second arm 200 are additionally attached on the base 100 so that the second arm 200 is attached at a position at least four and half inches from the first arm 200. The arms 200 may be attached to the base in a fully integrated way where the attachment point is fixed and substantially non-adjustable. The arms 200 may alternatively be attached to the base 100 through a base-arm attachment interface 110, which can be a mechanism supporting adjustment, flexibility, and/or temporary removal of the arms.

The height that the arms 200 extend, in one implementation, is preferably at least five inches, but alternative variations may have the arms extending more or less than five inches. For example, one implementation may use a tight fitting wedge for the arms. The two arms 200 are preferably attached to the base 100 in a configuration that provides a secure fit that provides support without overly gripping the instrument, which could damage the instrument. This can include various variations of the arm 100 in terms of position, angle, adding a base-arm attachment interface 110 that is flexible, including adjustment mechanisms, and/or other suitable features to provide different ways of holding the instrument. The configuration of the arms (or the adjustable configuration) can preferably accommodate securing a range of cello sizes, widths, and profiles (e.g., curvature of the front or back panel of the cell). Even cellos of the same size may have different widths or profiles.

Figure 7:
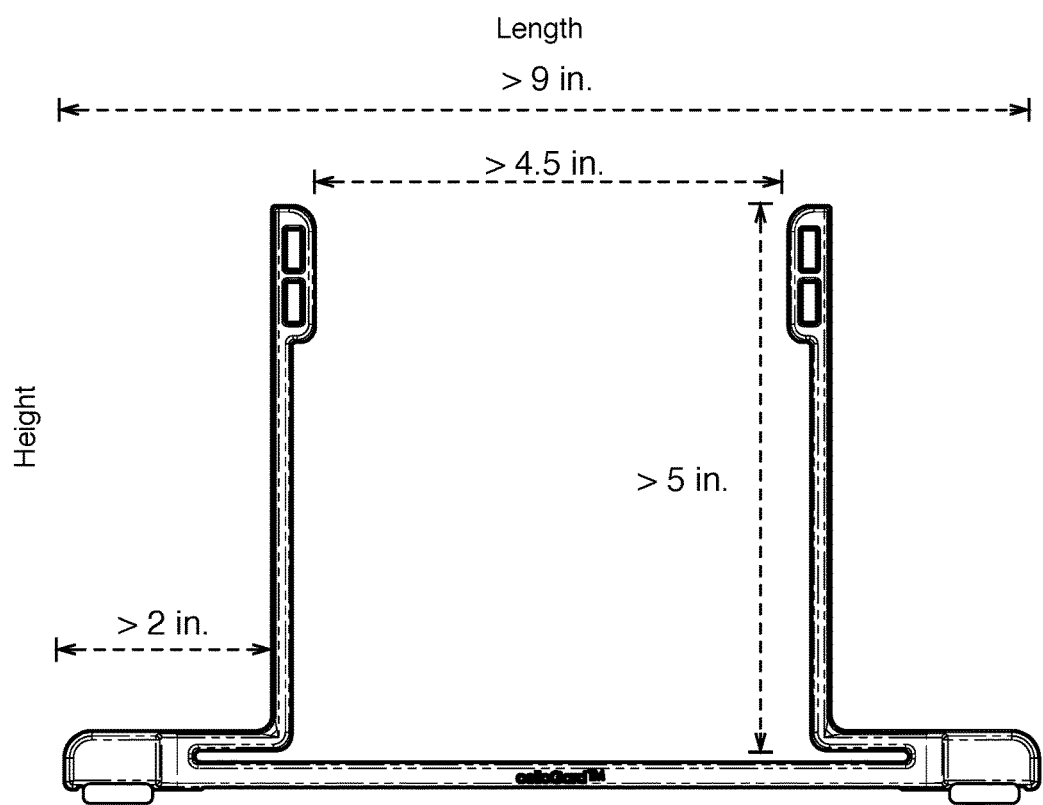
FIG. 7 is a schematic representation of a system with exemplary dimensions.

In a preferred implementation, at least one of the first and second arms 100 is flexibly attached to the base 200. Preferably, both arms are flexibly attached. In one variation, the arms are structurally flexible in the physical design and materials. For example, a plastic material with a thickness of less than a quarter inch may make the arms have a range of flexibility. In another variation, an arm is attached to the base through a base-arm attachment interface that may include structural flexibility. In one implementation, the base-arm attachment interface in one implementation is a cantilevered portion over the base as shown in FIG. 1 and FIG. 7. In alternative implementations, a flexible base-arm attachment interface could be a spring mechanism or any suitable mechanism that has a range of flexibility.

The flexibility preferably enables the cello holding cavity to expand in response to outward forces from within the cavity. The outward forces will generally originate from the cello form pressing outwards on the arms when being inserted. Removal of the cello removes the outward forces, and the arms 200 preferably return to a stable state. The structural flexibility of the arms 200 and/or the base-arm attachment interface 110 preferably provides sufficient resistance to securely hold a cello while also resisting substantial tipping of the cello. In one implementation, the structural flexibility of the first and second arms is configured to expand the size/length of the defined cello holding cavity by at least one inch for one pound of outward force applied on the first arm and at least one pound of outward force applied to the second arm. For example, if the cello inserted into the cavity exerts a force of one pound on one arm and a force of one pound on the second arm, the distance between the arm expands one inch. Such structural flexibility has been found to adequately hold a cello without applying excessive force on the instrument. However, other arm force responses could alternatively be configured for a more flexibility or a more rigid fit. Other flexibility performance properties may alternatively be configured for the system.

The flexible arms will preferably have a steady state position that establishes an initial distance between the engagement regions of two arms. The minimum distance measured along the length of the system will generally be the distance measured between the two contact pads of the arms. This initial distance is approximately within some flexible range substantially close to the measurement of the side width of a cello. Preferably, the distance between engagement regions of the first and second arms (i.e., the steady state size of the defined cello holding cavity) is less than or equal to the side width of a cello measured in the upper bout region. The flexible design of the system enables the arms to flex and increase the cavity length to fit around the side of a cello. The variable size of the defined cello holding cavity preferably has a range spanning a range of cello widths. The range of accommodated cello widths may include a full size cello, a three-quarters sized cello, a half-sized cello, and/or other cello sizes. Alternatively, the system may be designed for a particular cello size and/or even a particular instrument with little or even no practical flexibility in cello holding cavity size.

The steady state distance between the arms and the structural flexibility of the arms may be used to substantially target cellos with a range of side widths. For example, the range of side widths for recommended use can have a minimum cello side width that is at least (i.e., equal to or greater than) the distance between the engagement regions of the arms during the steady state position (so that dual-arm contact is promoted) and a maximum cello side width that is at most the maximum flexible size of the cello holding cavity (e.g., the distance between the attachment points of the two arms). In one implementation, the structural flexibility of the arms is configured to flex the arms from a steady state position to at most a substantially perpendicular orientation of the arms. The perpendicular orientation of the arms can be characterized by the size of the cello holding cavity opening being the distance between the attachment points of the two arms. This functions to enable the side of the cello to rest on the top surface of the base instead of being wedged against the sides of the arms opening at a obtuse angle. Alternative implementations may be used with the side of the cello not resting on the top surface of the base.

In one implementation, the system can be implemented as a set of elements that are substantially permanently assembled. Herein, being permanently assembled describes a set of components that are in a connected configuration that may necessitate tools to disassemble components. In one variation, the components of the system such as the base 100 and the arms 200 are a single integrated piece as shown in FIG. 1. In one particular implementation, the base, first and second arms, and optionally any base-arm attachment interfaces are a single injection molded structure. A single integrated part may simplify and reduce the cost of the manufacturing process. A single integrated part can also make usage of the system easier as there is no assembly required by the user. In another variation, the components of the system may be assembled with semi-permanent fixtures such as screws, snapfits, adhesive, and the like. Additional components such as contact pads for the base and/or the arms may be separate parts assembled onto the integrated part that includes the base and arms.

Alternatively, the base 100, first arm 200, second arm 200, and other components of the system may be multiple integrated parts. In some variations, components can be movable components that can be moved between different positions. The different positions may be used to adjust size of the cello holding cavity. The different positions may additionally or alternatively be used in transitioning between an open operating mode and a closed operating mode. Alternatively, a subset of components may be connectable components that can be assembled or disassembled by a user. A multi-part system may include an open operating mode and a closed operating mode, which functions to have a mode for engaging and holding the cello and one for travel (e.g., a compact form factor).

In one variation, the system can include at least two parts. For example, the system may include two parts where each includes a portion of the base structure and one arm. The two parts could detach, or engage with each other in some mechanized manner (to enable rotation, sliding, etc.). In another variation, the system include a distinct base part, a distinct first arm, and a distinct second arm that can be assembled into a cello stand in an open configuration for holding a cello. A multi-part system can additionally include adjustable components such as a collapsible base or arm, detachable base or arm, rotatable base or arm, and/or other engagement mechanisms.

The base 100 of a preferred embodiment functions as the stabilizing floor contact component. The base 100 is preferably a substantially flat planar structure that sits flat on the floor when the cello stand is being used to hold an instrument. The base 100 can have any suitable footprint. In one exemplary implementation, the footprint of a floor contact side of the base 100 is an elongated rectangle with a length to width ratio of at least two to one. Herein, length in reference to the system is defined as the dimension of the system when holding the cello that is substantially parallel to an axis defined to run between the front and back of the cello (e.g., when measuring the thickness/side width of the instrument); width in reference to the system is defined as the dimension of the system substantially parallel to an axis defined to run between the top and bottom of the cello; and height in reference to the system is defined as the dimension of the system substantially parallel to an axis defined to run between the right and left sides of the cello. The distance between the two arms 200 is approximately the distance between the front and back plates of a cello. More specifically, the base 100 preferably has a shape profile with a length of at least the side width of the widest supported cello. In one preferred implementation, the length of the base preferably has at least an additional two inches of length. In another preferred implementation, the length of the base is preferably greater than the side width of the widest supported cello (e.g., greater than 130% the side width). Such dimensions discussed herein are exemplary dimensions of preferred implementations and do not limit the system to just those dimensions. The extra length distance of the base functions to enhance the lateral stability of the instrument.

In one implementation, the base 100 has a shape profile with a width of at least two inches and a length of at least nine inches. The height in one implementation is less than an inch but any suitable height may alternatively be used. Portions of the base 100 may have width that exceed two inches The height of the base can be substantially low to provide a low center of mass. For example, the height could be a quarter to three-eighths an inch in some implementations. Preferably, the system is designed to have a compact form and so preferred implementations preferably have a width less than five inches, a length less than 18 inches, and height less than twelve inches. Any suitable dimensions may alternatively be used, and the exemplary dimension sizes serve as exemplary ranges for particular implementations.

Figure 8:
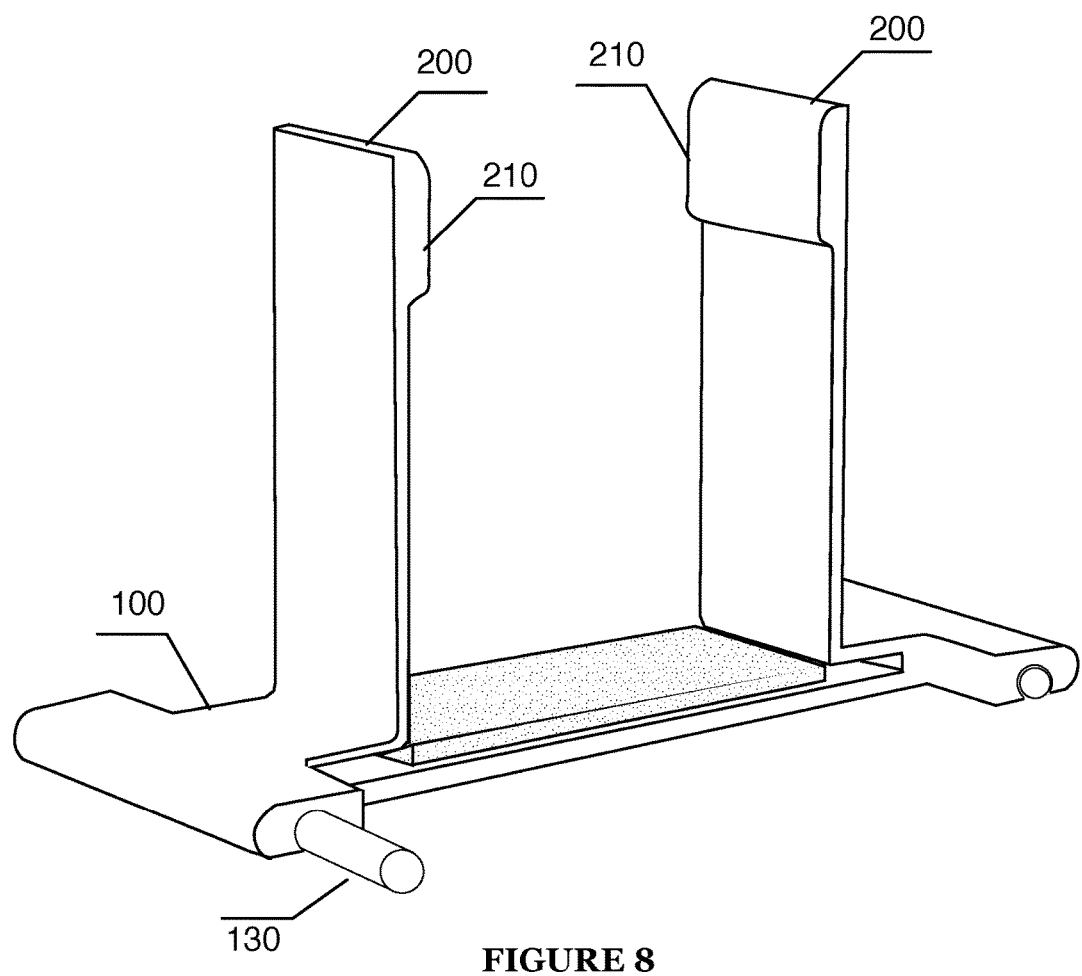
FIG. 8 is a schematic representation of a preferred implementation with base support elements.

The base may additionally include one or more base supports, which function to augment the contact surface area of the base. The base supports may be static or could be a collapsible. In one variation, a collapsible base support may function to expand the footprint of the base to provide enhanced stability. The base support may have one or more telescoping members that can be extended outward. In one variation, the base 100 includes a pair of static flanges features 130 that extend out from the base, effectively increasing the width of the base 100. A pair of flanges 130 may be part of the base 100 extending out along the width dimension as shown in FIG. 1. In one variation, the flanges 130 are fixed. In another variation, the flanges 130 can be retractable so that they can be collapsed or expanded. In one implementation, the retractable flange is telescoping as shown in FIG. 8. In another implementation, a base support element is fixtured to the underside of the base 100 and is rotatable along a hinge. The base support can be rotated outward when in an open configuration and rotated to align with the main structure of the base support when in a closed configuration.

The base 100 may include a set of ground contact pads on a bottom surface of the base 100. A contact pad may be a friction-enhanced element that functions to increase friction or grip with the floor surface. The base 100 may alternatively include one or more feet that contact the floor at distinct points. The base 100 is preferably made of a solid rigid material such as plastic, aluminum, wood, and/or other suitable materials.

The base 100 can additionally include base padding along the central region of a top surface of the base. The top surface is defined as the surface of the base that is exposed to and potentially in contact with a held cello. The base padding is preferably within the cello holding cavity. The base padding is preferably a foam pad, a stuffed fabric covering, an elastic membrane or fiber, and/or some alternative structure that provides a cushion to a held instrument. Additionally or alternatively, a spring may be utilized within the base pad.

Figure 22:
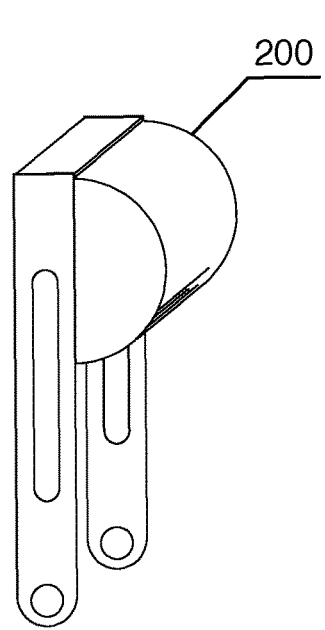
FIGS. 22 and 23 are schematic representations of variations of exemplary arms.
Figure 23:
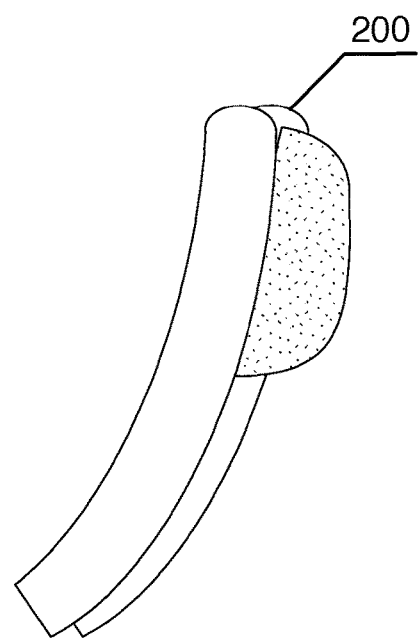

The arms 200 of a preferred embodiment function to extend partially up the side of a held cello to stabilize the instrument. There are preferably two arms 200 that, when used in an open configuration, hold the instrument in between the two arms. There may alternatively be any suitable number of arms 200 in the set of arms. For example, there could be two arms 200 for the front of the instrument and two arms 200 for the back of the instrument. The arms 200 could be a substantially rigid object but may alternatively be collapsible by folding in half, telescoping, disassembling, or otherwise convert to a closed configuration. A variety of arm designs may be used. The arms are preferably substantially straight structures as shown in FIG. 22. The arms may alternatively be angled as shown in FIG. 23 or have any suitable shape or form.

The arms 200 preferably make contact with the instrument when engaged with the cello and may apply a small amount of force in opposing directions to hold the instrument. Alternatively, the arms 200 may be set to offer a small spacing between the arm and the instrument depending on how the instrument is resting in the stand. The arms 200 are preferably substantially similar such that a cello may be set into the stand in either direction. Alternative variations may have a first arm customized to be set against the back of the instrument and a second arm customized to set against the front of the instrument.

Each arm 200 preferably includes at least one contact pad 210, which functions to promote a particular engagement region of contact with an engaged cello. The contact pads are preferably located at the distal end of an arm (i.e., the end opposite the end attached to the base). The contact pads 210 preferably protrude out from the inner side of the arms in the direction of the length of the cello holding cavity. The contract pad 210 will generally protrude into the cello holding cavity further than where the arm is attached to the base. This can mitigate amount of contact at the lower portion of the arm in some implementations. Alternatively, the arms 200 may be designed such that contact can be safely made over multiples regions of the arm. Preferably, each arm 200 includes one contact pad 210, and the two contact pads 210 are aligned to oppose each other across the length of the cello holding cavity.

The contact pad 210 can include a graduated slope inwards towards the cell holding cavity. As a cello is inserted into the cello stand, the slope can guide a slightly misaligned cello into the cello holding cavity. The contact pads 210 can additionally include padding and/or a protective coating. The padding can supply some give when contacting the cello. The protective coating preferably reduces the chance of scratching the surface of an instrument.

In one variation, the contact pads 210 can be removable. A removable contact pad may function to enable different contact pad sizes to be used to accommodate different cello sizes.

Figure 9:
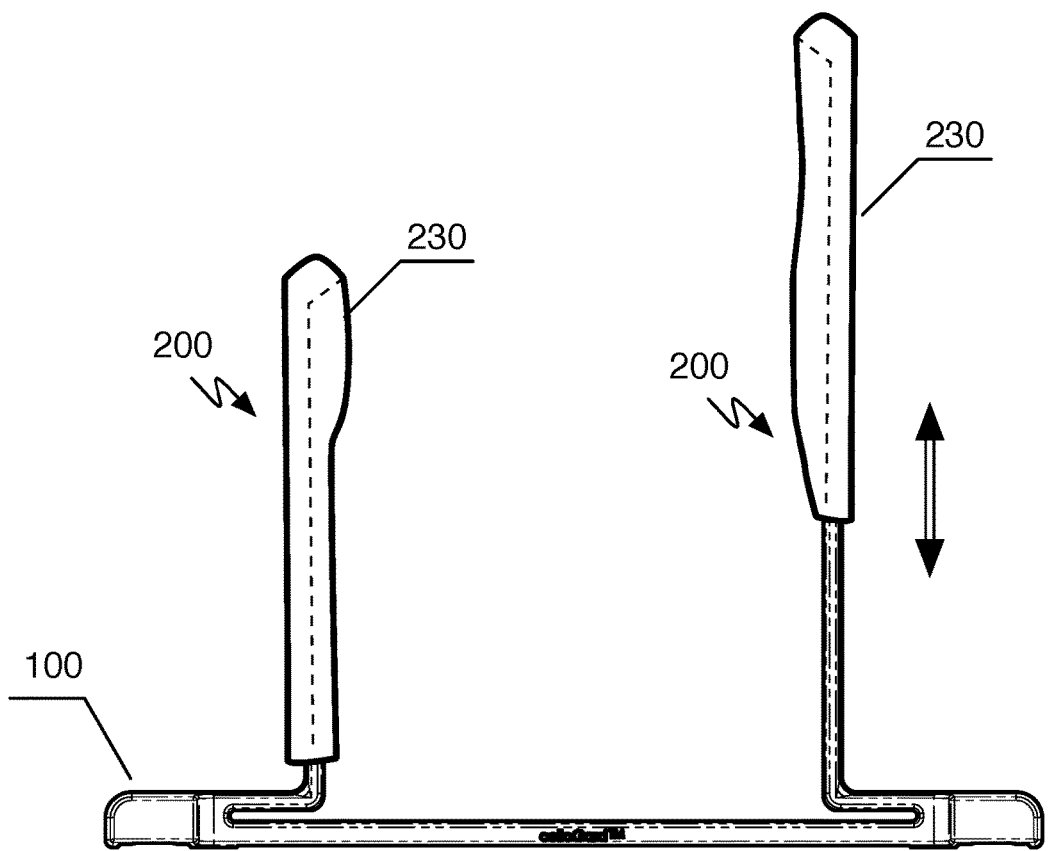
FIG. 9 is a schematic representation of the system with arm sleeves.

In one variation, the system may additionally include arm sleeves 230, which are removable covers that can be placed over the arms. A first and second arm sleeve 230 preferably removably covers both a first and second arm as shown in FIG. 9. The arm sleeves 230 are preferably made of a non-scratching material such as neoprene or another fabric. The arm sleeves 230 may include a contact pad such as the one described above, wherein the contact pad is part of the cover as opposed to the arm.

The angle, spacing, and height of the arms are preferably configured to promote a targeted feel for how the instrument is held. Preferably, the system is designed to accommodate a range of instrument sizes and shapes and to feel secure but easily removable. In a first variation, the arms 200 are angled inward to make contact at the distal ends of the arms (e.g., at a contact pad 210). The distance between the two distal ends is preferably slightly less than the side width of a cello. The exact spacing can vary depending on the flexibility (if any) of the arms. In one exemplary implementation, the spacing is greater than 4.5 inches and less than 5.5 inches. The height of the arms is preferably less than the distance from the cello edge to the fingerboard. In some implementations, a height of 4 inches to 8 inches can provide sufficient holding capability while accommodating a wide range of instrument sizes. In some variations, the angle, spacing, and/or height may be adjustable. As mentioned above, the arm 200 could be statically fixtured to the base 100, removably attached to the base 100, and/or be adjustably attached to the base 100.

The system can additionally include a case 300 to hold the system when in a closed-configuration. The case 300 could be a hard or soft container with a cavity defined to hold the system when in a closed-configuration. In one variation, the case 300 can be attached to a cello case. As a similar alternative, the case may be molded or shaped to fit securely in an open space in a cello case when a cello is stored inside. Alternatively, the system could use one or more straps that can wrap around portions of the system when in a closed-position.

In yet another variation, the system can be physically coupled to a chair, a music stand, or another base structure. For example, a brace can extend out from a leg of chair and attach to the base of the system. This functions to ground the cello stand and enable cello holding capabilities to a practice set up which normally includes a chair, music stand, or some other object.

As mentioned, the system may be a substantially static system without movable or adjustable components. The system may alternatively be made of multiple parts. In one implementation, a system with multiple parts can be assembled for use or disassembled for storage or transport. For example, the base 100 and arms 200 may be attached when used to hold a cello and detached when needed to be packed for storage. In another variation, one or more components (e.g., the base 100 or arms 200) can be a dynamic element that can be adjusted, collapsed, or otherwise augmented for different uses. Dynamic elements may be used for enabling a system to have an open and closed operating mode. Dynamic elements may additionally or alternatively be used for adjustments such as for adjusting the shape or dimensions of the cello holding cavity to customize the fit for user's cello.

A dynamic base is preferably collapsible such that the base 100 can be changed between at least two states: one state for storage (a closed operating mode) and one stage for use (an on open operating mode).

A collapsible base could be collapsed using a sliding mechanism as shown in FIG. 10, a folding mechanism as shown in FIG. 11, a multi-part design as shown in FIG. 12, and/or any suitable system design to facilitate transitioning the base and the system from an open configuration for holding a cello and at least a closed configuration for storage.

In a sliding mechanism variation, the base 100 could slide lengthwise (e.g., changing the effective length of the base) between an expanded open configuration to a collapsed closed configuration. A first and second base component preferably physically couple through the sliding mechanism. In one implementation, the first and second base components may engage in a complimentary grooves along an internal or external surface of the base component such that they can telescope.

In a folding mechanism variation, the base 100 can include a first base half and a second base half that are coupled together through a hinge or other rotatable attachment mechanism, whereby the base can rotate between an open operating mode configuration and a closed operating mode configuration. The hinge is preferably positioned substantially in the middle of the length (e.g., the long dimension of the base) so that the base 100 can fold in half along the axis of the hinge. The hinge could be a traditional door hinge with a set of leaves that rotate about a pin. The hinge could alternatively be a living hinge made material flexible along an axis.

A base hinge can preferably be set to be in stable state in the closed and open configurations. In one variation, a locking mechanism can be used to secure the base in one of the closed and open configuration. The locking mechanism could be a latching fastener, a magnetic fastener, and/or any suitable type of fastener. A locking mechanism could be used in one or both configurations.

The base hinge could also include one or more reinforced stable states. A base hinge with a reinforced stable state may include a spring-loaded mechanism. A spring-loaded hinge could naturally transition the base to a preset configuration. For example, a spring-loaded hinge could spring the base to an open configuration, unless the base is latched or otherwise restricted to a closed configuration. In another variation, the hinge could be made of one or more concave metal ribbons mounted lengthwise connecting the first and second base halves. The concave metal ribbons are preferably flexibly deformable but with a stable state when straight.

Figure 13:
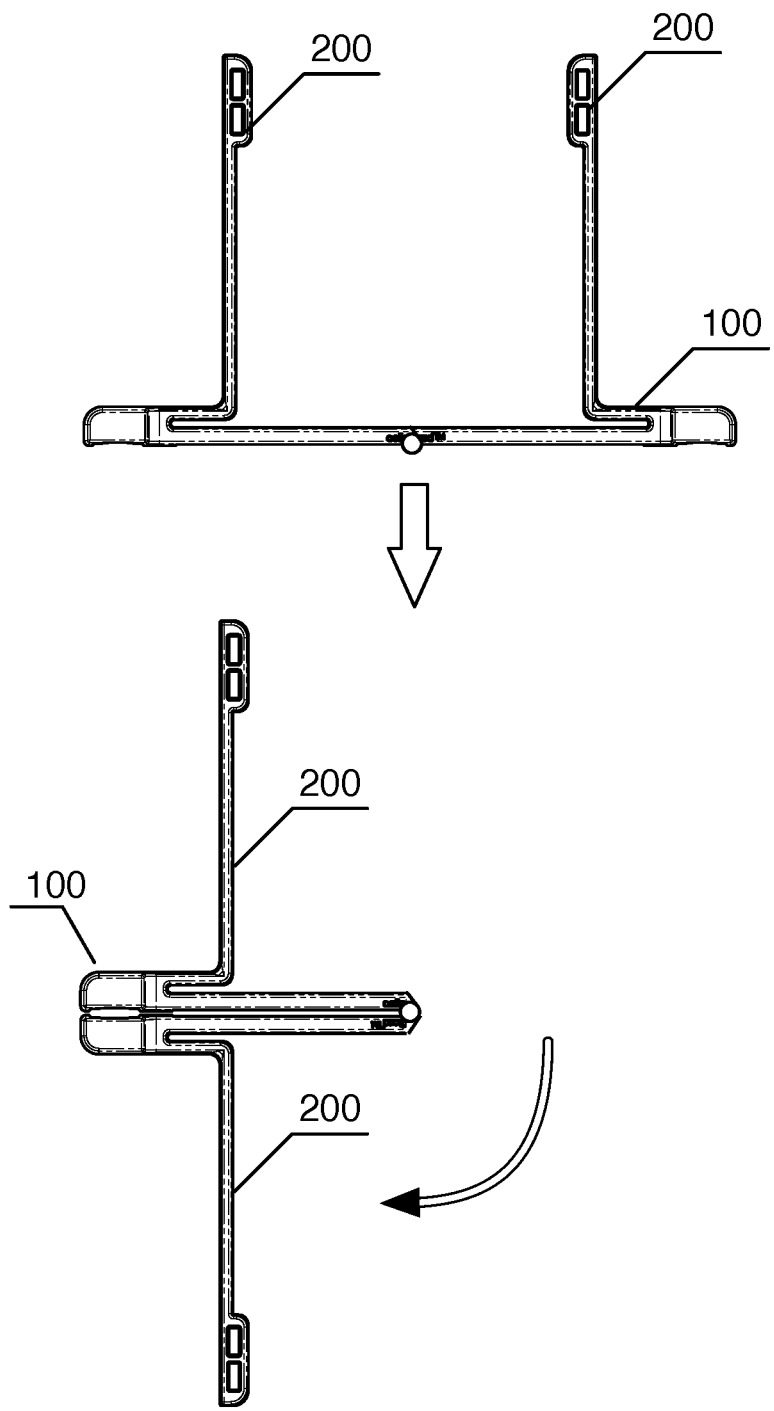
FIG. 13 is a schematic representation of a collapsible base with integrated arms.

As shown in FIG. 13, the dynamic base may be used in a variation where arms are statically attached to the base 200. An arm 200 could be attached to two different base halves. An alternative approach could have the hinge such that the two base halves rotate in the horizontal plane (compared to vertical plane) where the two arms could couple in a closed operating mode.

In a multipart variation, the base 100 may be disassembled into two or more parts for collapsed storage. Preferably, the base includes a first component and a second component that can be connected in an open configuration. The first and second components could stack when in a closed configuration. A multipart variation may be substantially similar to a hinged variation except without the hinge coupling the first and second base halves. The multiple base components preferably latch, snap, or otherwise connect.

In some variations, the base 100 or the base components (e.g., a first and second base component) can include defined cavities that compliment one or more arms or a complimentary portion of the other base component(s) when in a closed configuration. For example, the base may include cutouts that accommodate pads of an arm so that the system could be more compact when in a closed configuration.

In addition to or as an alternative approach, one or both arms 200 can be made dynamic, which function to enable the arms 200 to be adjusted, collapsed, or otherwise augmented. A system with a dynamic arm preferably includes a base-arm attachment interface 110, which functions to facilitate coupling an arm to the base. Preferably, there is a first and second base-arm attachment interface 110 to accommodate a first and second arm 100. A wide variety of coupling mechanisms may be used for the base-arm attachment interface.

Figure 14:
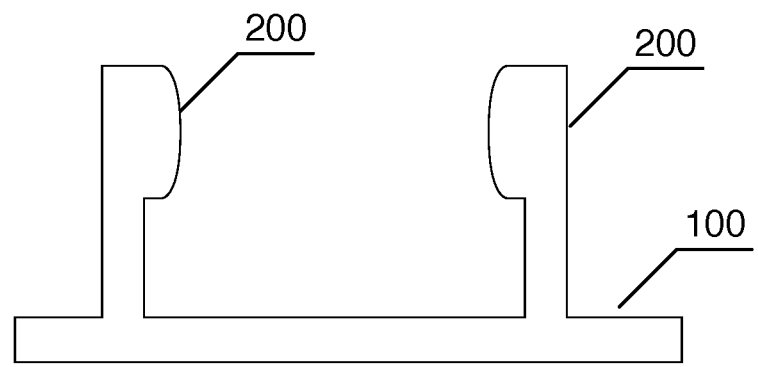
FIGS. 14-16 are schematic representations of variations of a system with a static base-arm attachment fixture.
Figure 15:
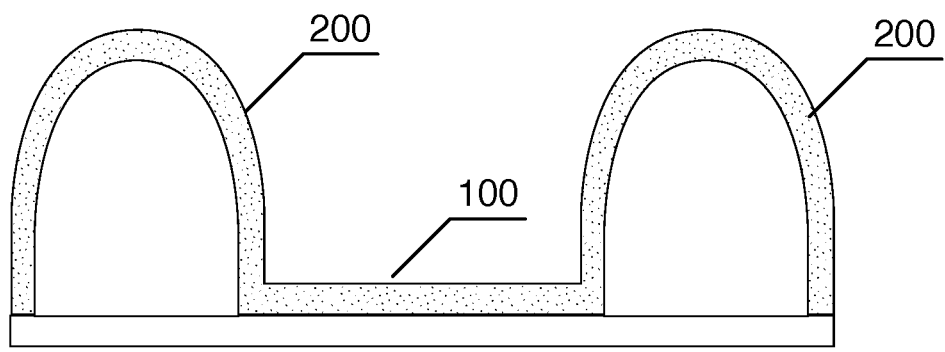
Figure 16:
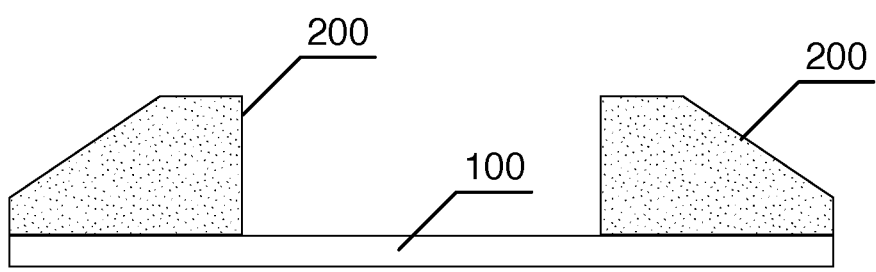

In a first set of variations, the base-arm attachment interface 110 is a static fixture as shown in FIGS. 14-16, wherein the arm 200 can be permanently attached to the base 100 through an adhesive, a manufacturing process (e.g., welding), a semi-permanent fixture mechanism (e.g., bolted together), and/or any suitable rigid attachment mechanism. In one alternative embodiment, the base 100 and the arms 200 may be made of a single piece of material, wherein there is no distinct base-arm attachment element as shown in FIG. 13. In a preferred implementation, the base-arm attachment interface 110 is a planar structure cantilevered over the top surface of the base and attached to an arm. This can be part of an injection molded single piece design, where the cantilevered base-arm attachment interface has an additional defined slot extending in from the cello holding cavity as shown in FIGS. 1 and 7.

Figure 17:
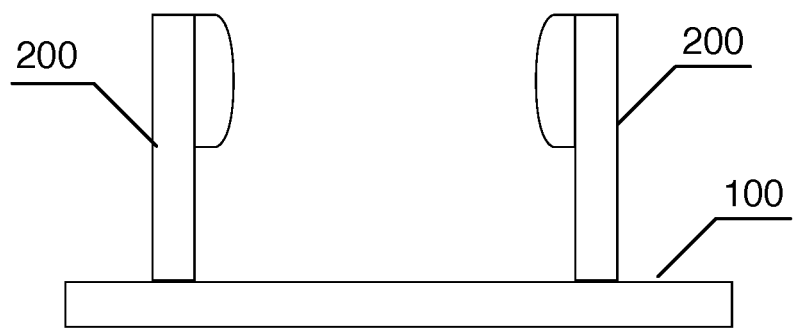
FIG. 17 is a schematic representation of a variation of a system with a detachable arm.

In a second set of variations, the base-arm attachment interface 110 is a detachable fixture mechanism wherein an arm 200 is detachable where it can be attached and removed in a substantially easy manner as shown in FIG. 5 and FIG. 17. A detachable fixture mechanism functions to enable the arms 200 to be set in position when used in an open configuration and detached and stored during a closed configuration. The arms preferably connect and detach from the base through a base-arm attachment interface. When in a closed configuration, a subset of the components can be disconnected and arranged for storage. Snaps, screws, latches, clips, latches, and/or other attachment mechanisms can be used in securing an arm at an attachment point.

Figure 18:
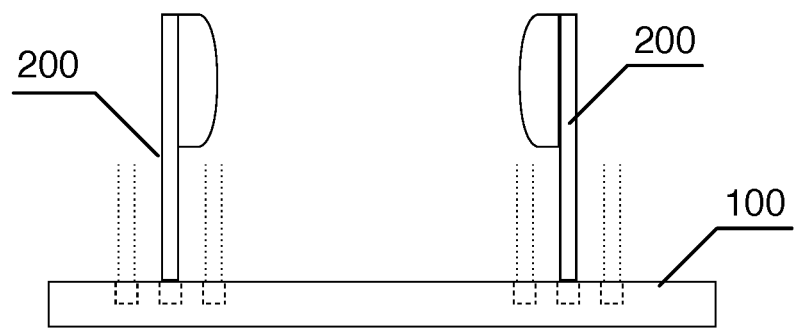
FIGS. 18 and 19 are schematic representations of a system with adjustable arms.
Figure 19:
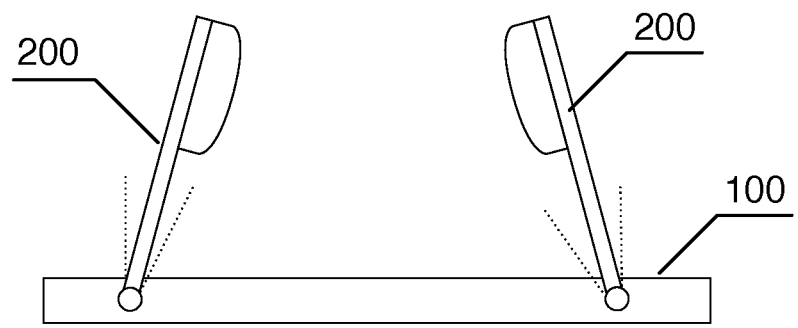

In a third set of variations, the base-arm attachment interface 110 is an adjustable attachment point as shown in FIGS. 18 and 19. The base-arm attachment interface 110 can include a set of mechanisms that accommodate one or more degrees of freedom for how an arm is mounted. In a spacing adjustable variation, an adjustable base-arm attachment interface can be adjustable along the lengthwise axis of the base, which functions to adjust the coupling point of an arm to the base. A spacing adjustable variation can include a set of distinct position options. For example, the spacing may be adjusted to one of three positions. Alternatively, the spacing may be adjustable within a range of position. For example, the base-arm attachment interface 110 can enable an arm 200 to be mounted anywhere along a groove. In another example, the position of the adjustable base-arm attachment interface 110 may be slidable along the lengthwise dimension of the base in a sub-region of the base 100.

In rotational variation, an adjustable base-arm attachment interface 110 can be mounted at a set of selectable angles. Angle adjustment can function to adjust the spacing and/or the tightness of a held instrument (e.g., the amount of arm deflection). Similar to the spacing adjustable variation, a rotational adjustable variation can include a set of distinct angle positions of a mounted arm or enable selection of an angle within range of angles.

Figure 20:
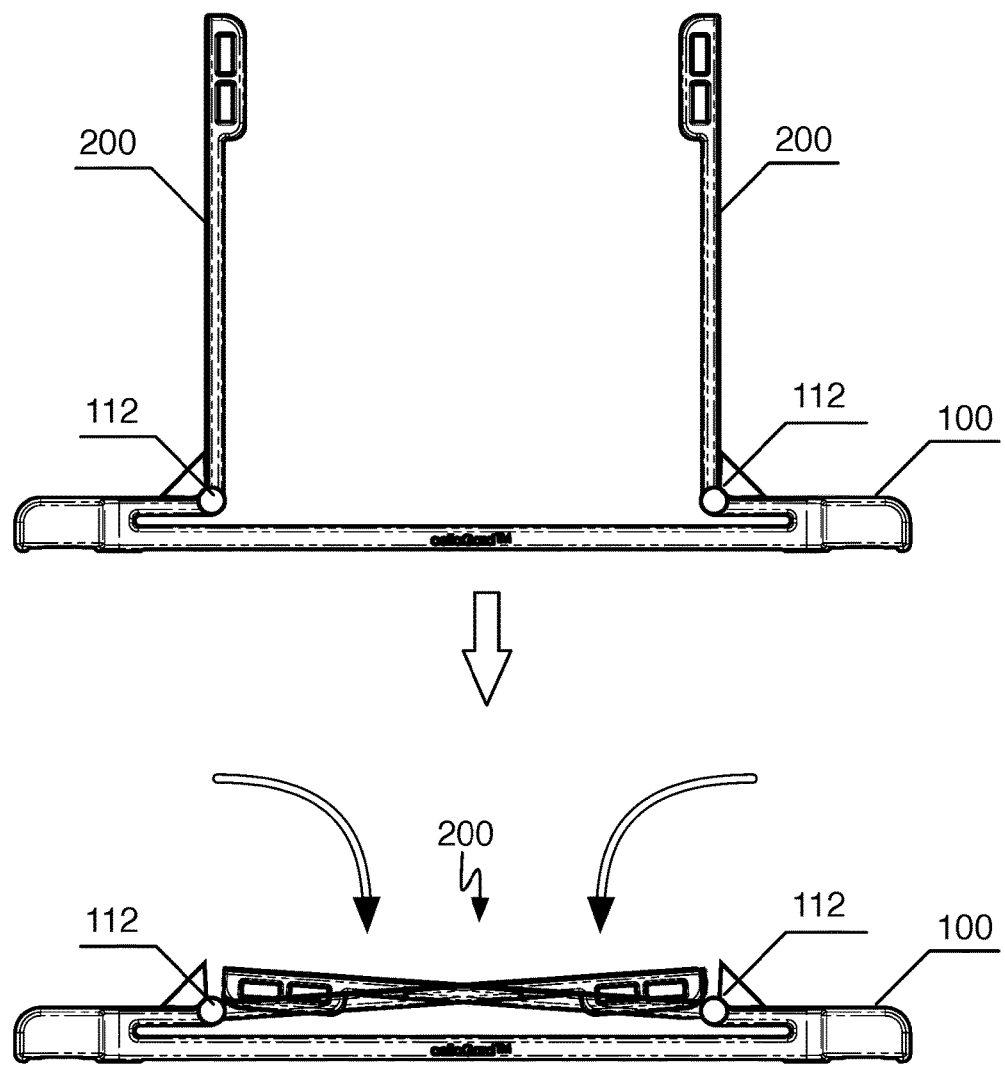
FIG. 20 is a schematic representation of a variation with rotating arms.

A rotational variation may additionally or alternatively enable the arms 200 to switch between an open and closed operating mode as shown in FIG. 20. In one implementation, the arms 200 may be rotatable to fold into a closed operating mode and then folded open to an open operating mode. For example, a base-arm attachment interface 110 can include a hinge 120 with a rotational stop so that the arms can fold down or rotate up to a position for the open operating mode. The rotational stop preferably prevents free rotation of the arms 200 about the hinge beyond the stable state position of the arms 200 when engaging a cello.

Figure 21:
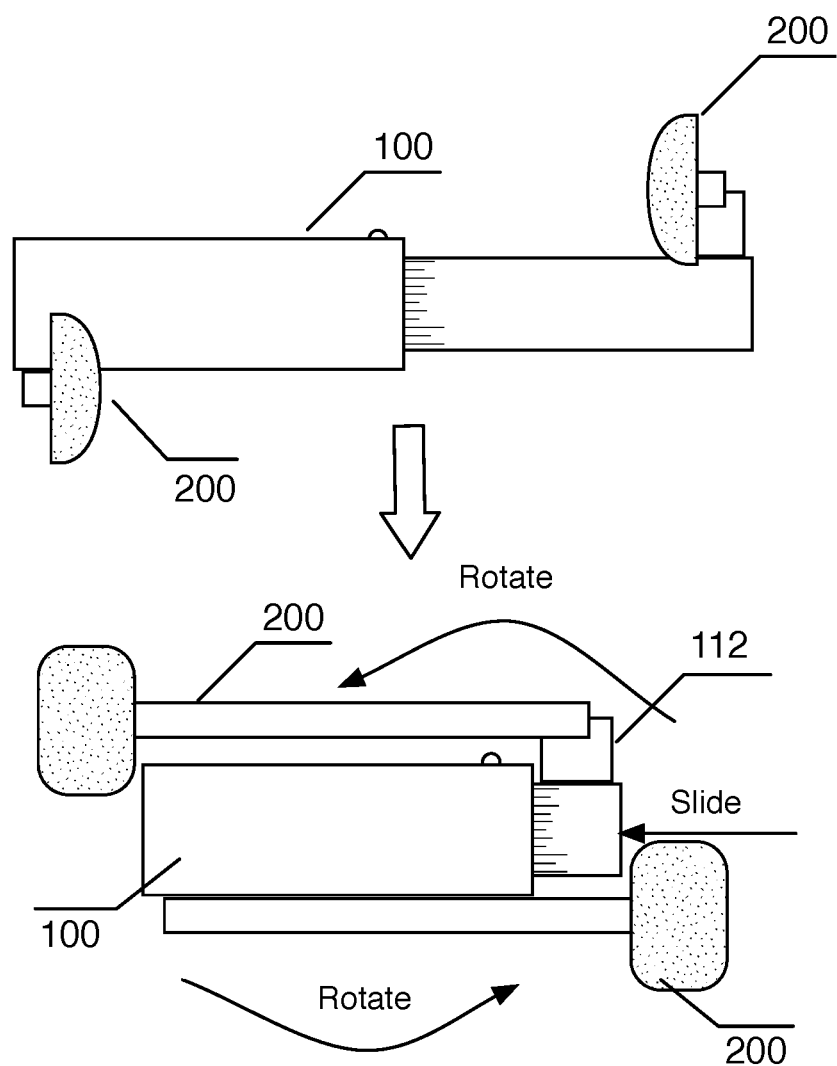
FIG. 21 is a top view schematic representation of one preferred embodiment.

An adjustable base-arm attachment interface 100 may be a substantially permanent fixture wherein the components are substantially permanently assembled. For example, an arm 200 may not be easily removable (e.g., for regular usage) and is instead moved into a closed configuration (e.g., folded down for storage) as shown in FIG. 21.

An adjustable base-arm attachment interface 110 may alternatively be detachable where the arm 200 can be repositioned when coupled to the base through the base-arm attachment interface 110 and then easily decoupled from the base 100 when used in a closed configuration. For example, the detachable arms of FIG. 5 may be re positioned along a groove to adjust the spacing between the two arms.

The first and second base-arm attachment interfaces 110 can be substantially similar types. However, the first and second base-arm attachment interfaces 110 may be different types. For example, a first base-arm attachment interface may be detachable and adjustable and a second base-arm attachment interface may be just detachable.

As described herein, there are wide varieties of configurations of the system with different variations or features that can be used in any suitable combination.

As a first exemplary implementation shown in FIG. 1, a cello holding stand preferably includes a base with two arms attached to the base in an upward direction defining a cello holding cavity in the space between the inner sides of the two arms and a top surface of the base. The arms are preferably attached to the base through a cantilever structure that functions to provide a range of angular flexibility when engaging a cello.

As a variation of the exemplary implementation, the arms may attach at a hinge and fold down when in a closed operating mode. In another variation, the base may be a two-part base, with the two parts connected at hinge. The hinge preferably has a one end of rotation set so that the two base parts meet in an open operating mode and a second end of rotation set so that the two base parts can fold side by side. The base shape profile and the arm positioning and shape profile may include offsets and complimentary shape profiles so that the two parts can be rotated substantially side-by-side when in a closed operating mode.

Figure 4:
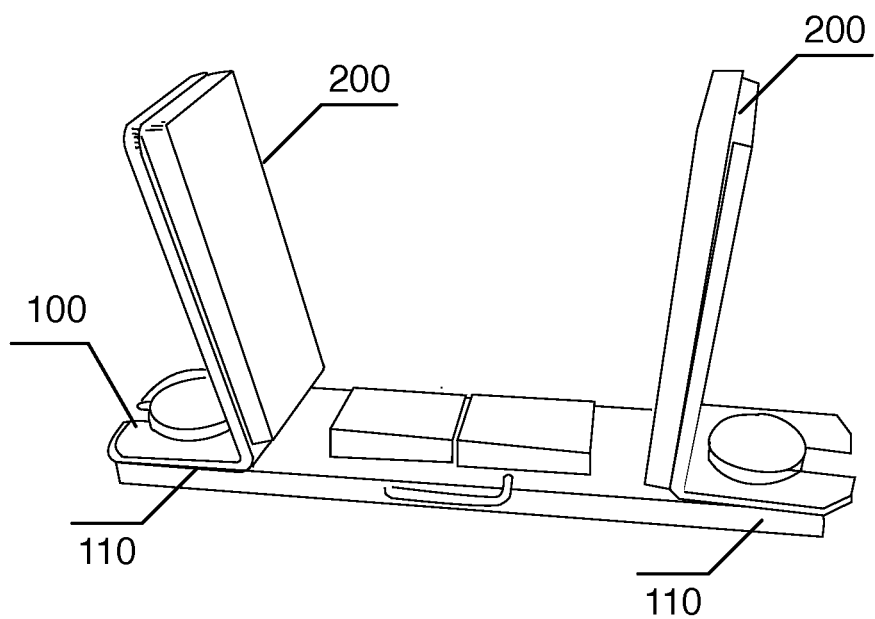
FIG. 4 is a schematic representation of a preferred embodiment in an open configuration.
Figure 5:
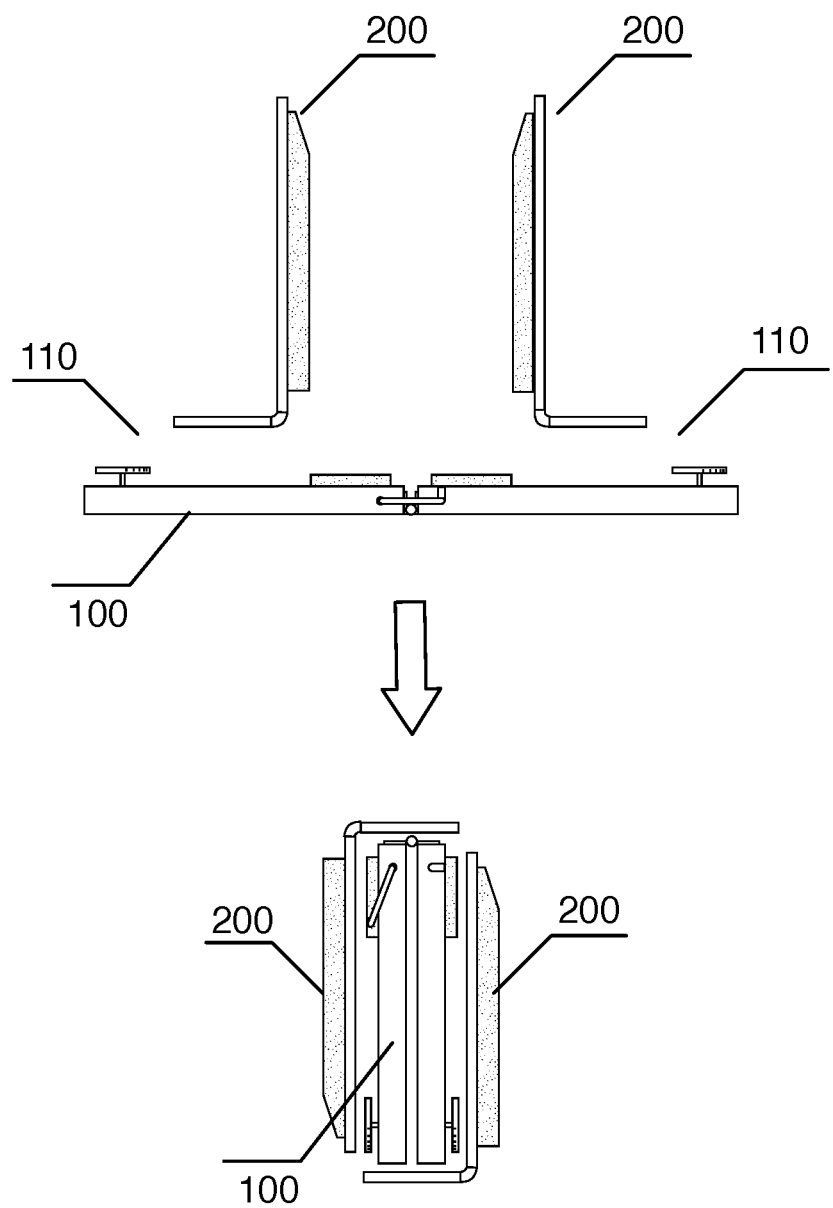
FIG. 5 is a schematic representation of a preferred embodiment transitioning to a closed configuration.

As shown in FIGS. 4 and 5, another exemplary implementation has hinged base and removable arms. The hinged base can include a central foam pad. Additionally, a latch could be used to lock a first base component to a second base component when in an open configuration. The base arm attachment could be an adjustable dial screwed into the top surface of the base. The arm preferably has a flat section with defined groove such that the arm can be slid under the dial. The dial can be tightened to secure the arm in place. Additionally, the groove may provide some level of adjustability in the arm spacing. As shown in FIG. 5, the various components can be disassembled and arranged to form a compact arrangement. The arranged elements can be fit into a bag and then stored with a cello. The case preferably fits in various cavities of the cello and/or a cello case.

As a person skilled in the art will recognize from the previous detailed description and from the figures and claims, modifications and changes can be made to the embodiments of the invention without departing from the scope of this invention as defined in the following claims.

I claim:

1. A cello stand for holding a cello comprising:
    a base;
    a first and second arm, where each arm comprises at least one cello engagement region on an inner-side of the arm;
    each arm being attached in an upright orientation along the length of the base;
    wherein the base, the first arm, and the second arm comprise at least two parts;
    wherein the base comprises of a first base component connected to a second base component through a hinge, whereby the base can rotate between an open operating mode position and a closed operating mode position; and
    wherein the inner-sides of the first and second arms and a top surface of the base define a cello holding cavity.

2. The system of claim 1, wherein the first and second arm extend upwards within the cello holding cavity of at least five inches; and the first arm is attached to the base at a position at least two inches from a first end of the base; and second arm is attached to the base at a position at least four and a half inches from the first arm and at least two inches from a second end of the base along the length of the base.

3. The system of claim 2, wherein the base is a substantially planar structure including a set of ground contact pads on a bottom surface of the base; and the base having a shape profile with a length of at least nine inches.

4. The system of claim 1, wherein at least the first arm is flexibly attached to the base.

5. The system of claim 4, wherein the first and second arms are made of plastic material attached to the base through a spring mechanism, wherein the spring mechanism has a range of flexibility defined to expand the defined cello holding cavity by at least one inch for one pound of outward force applied on the first arm and at least one pound of outward force applied to the second arm.

6. The system of claim 4, wherein the distance between engagement regions of the first and second arms is less than or equal to a side width of an upper bout of a cello.

7. The system of claim 1, wherein the defined cello holding cavity has a variable length spanning at least the side width of a half-sized cello to the width of a full sized cello.

8. The system of claim 1, wherein the first and second arm each comprise a cello contact pad that protrudes out from the inner side of the arm.

9. The system of claim 8, further comprising two arm sleeves that removably cover the first and second arms.

10. The system of claim 1, wherein the base comprises: a first pair of flanges extending out from the base at a first end of the base, and a second pair of flanges extending out from the base at an end opposite of the first end of the base.

11. The system of claim 1, wherein the system is collapsible through use of a closed operating mode of the at least two parts.

12. The system of claim 1, wherein the arms are detachable and connect to the base through a base-arm attachment interface.

13. The system of claim 1, wherein the arms are attached to the base through a base-arm attachment interface that includes a hinge whereby the arms can rotate between an open operating mode position and a closed operating mode position.

14. The system of claim 1, wherein the base comprises a first base component connected to a second base component through a sliding mechanism, whereby the base can slide between an open operating mode position and a closed operating mode position.

15. A cello stand structure comprising:
    a base component comprised of a first base component connected to a second base component through a hinge, whereby the base can rotate between an open operating mode position and a closed operating mode position;
    a first and second arm, each including:
        a contact pad on a distal end of the arm, the first and second contact pads opposing each other;
    the first arm attached to the base through a first flexible base-arm attachment interface, the first arm attached in an upright position;
    the second arm attached to the base through a second flexible base-arm attachment interface, the second arm attached in an upright position and oriented so that the inner-sides of the first and second arms and a top surface of the base define a cello holding space; and
    wherein the base, the first arm, and the second arm comprise at least two parts.

\* \* \* \* \*